(12) United States Patent
Srinivasan et al.

(10) Patent No.: US 8,054,148 B2
(45) Date of Patent: Nov. 8, 2011

(54) CONTACT MATERIAL, DEVICE INCLUDING CONTACT MATERIAL, AND METHOD OF MAKING

(75) Inventors: Duraiswamy Srinivasan, Bangalore (IN); Reed Roeder Corderman, New York, NY (US); Christopher Fred Keimel, Schenectady, NY (US); Somasundaram Gunasekaran, Bangalore (IN); Sudhakar Eddula Reddy, Bangalore (IN); Arun Virupaksha Gowda, Rexford, NY (US); Kanakasabapathi Subramanian, Chennai (IN); Om Prakash, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/893,444

(22) Filed: Sep. 29, 2010

(65) Prior Publication Data

US 2011/0062003 A1    Mar. 17, 2011

Related U.S. Application Data

(63) Continuation-in-part of application No. 11/480,812, filed on Jul. 5, 2006, now abandoned.

(51) Int. Cl.
*H01H 1/02* (2006.01)

(52) U.S. Cl. ........ 335/196; 200/238; 200/262; 200/264; 200/270

(58) Field of Classification Search .................. 335/196; 200/262–270, 600; 29/880
See application file for complete search history.

(56) References Cited

U.S. PATENT DOCUMENTS

| | | | |
|---|---|---|---|
| 3,610,859 A | 10/1971 | Schreiner et al. | |
| 3,622,944 A | 11/1971 | Tsuchlya et al. | |
| 3,778,576 A | 12/1973 | Anderson et al. | |
| 3,951,872 A | 4/1976 | Neely | |
| 6,406,984 B1 | 6/2002 | Russell et al. | |
| 6,864,767 B2 | 3/2005 | Streeter et al. | |
| 2004/0075514 A1 | 4/2004 | Ono et al. | |
| 2006/0272429 A1 | 12/2006 | Ganapathi et al. | |

FOREIGN PATENT DOCUMENTS

| | | |
|---|---|---|
| EP | 1863051 B1 | 9/2006 |
| GB | 584361 | 10/1946 |
| GB | 800551 | 8/1958 |
| SU | 1644240 A1 | 4/1991 |
| WO | WO2005066987 A1 | 7/2005 |
| WO | WO2005119721 A2 | 12/2005 |
| WO | WO2006101464 A1 | 9/2006 |

OTHER PUBLICATIONS http://en.wikipedia.org/wiki/Room_temperature, downloaded Sep. 17, 2010.

*Primary Examiner* — Ramon Barrera
(74) *Attorney, Agent, or Firm* — Richard D. Emery

(57) ABSTRACT

A device for controlling the flow of electric current is provided. The device comprises a first conductor as thin film form; a second conductor switchably coupled to the first conductor to alternate between an electrically connected state with the first conductor and an electrically disconnected state with the first conductor. At least one conductor further comprises an electrical contact, the electrical contact comprising a solid matrix comprising a plurality of pores; and a filler material disposed within at least a portion of the plurality of pores. The filler material has a melting point of less than about 575 K. A method to make an electrical contact is provided. The method includes the steps of: providing a substrate; providing a plurality of pores on the substrate; and disposing a filler material within at least a portion of the plurality of pores. The filler material has a melting point of less than about 575 K.

12 Claims, 3 Drawing Sheets

CONTACT MATERIAL, DEVICE INCLUDING CONTACT MATERIAL, AND METHOD OF MAKING

CROSS REFERENCE TO RELATED APPLICATIONS

This application is a continuation-in-part of U.S. patent application Ser. No. 11/480,812, entitled "Contact Material, Device Including Contact Material, and Method of Making," filed Jul. 5, 2006, which is herein incorporated by reference.

BACKGROUND

The present disclosure is related to an electrical contact material. More particularly, the present disclosure is related to a contact material for low force actuators and a method for making the same.

With the recent advances in the miniaturization of electronic devices, there is a huge demand for microswitches that have small geometries, are capable of microsecond switch timing, and have low power consumption. Microelectromechanical system (MEMS) switches are ideally suited for such applications because of their small geometries, minimal switch mass and momentum, for their low power consumption, and the possibility of fabricating using standard MEMS and semiconductor fabrication techniques. Critical performance criteria for MEMS switches are low contact resistance, microsecond switch operation, voltage standoff, and high reliability. The small mass of a MEMS switch enables rapid switch timing, but sacrifices contact force and hence contact resistance. The low actuation force leads to a large resistance of the order of ohms. Therefore, there is an increasing demand for contact materials and contact structures that significantly reduce the contact resistance while maintaining the contact structural stability that enables long life of millions to billions of operation cycles.

SUMMARY

Embodiments presented herein provide a device comprising an electrical contact with a low contact resistance. For example, one embodiment is a device for controlling the flow of electric current. The device comprises a first conductor; a second conductor switchably coupled to the first conductor to alternate between an electrically connected state with the first conductor and an electrically disconnected state with the first conductor. At least one conductor further comprises an electrical contact, the electrical contact comprising a solid matrix comprising a plurality of pores configured so as to exhibit an open pore structure; and a filler material disposed within at least a portion of the plurality of pores. The filler material has a melting point of less than an operating temperature of the device.

Another embodiment is an electrical contact material. The electrical contact comprises a solid matrix comprising a plurality of pores configured so as to exhibit an open pore structure, the solid matrix comprising gold; and a filler material disposed within at least a portion of the plurality of pores. The filler material comprises a metal with a melting point of less than about 298 K.

Another aspect is to provide a versatile method to make such electrical contacts. The method includes: providing a substrate; forming a plurality of pores in the substrate the pores being configured so as to exhibit an open pore structure; and disposing a filler material within at least a portion of the plurality of pores. The filler material has a melting point of less than about 298 K.

BRIEF DESCRIPTION OF DRAWINGS

The disclosure presented herein will become better understood when the following detailed description is read with reference to the accompanying drawings in which like characters represent like parts throughout the drawings, wherein.

DETAILED DESCRIPTION

Figure 1:
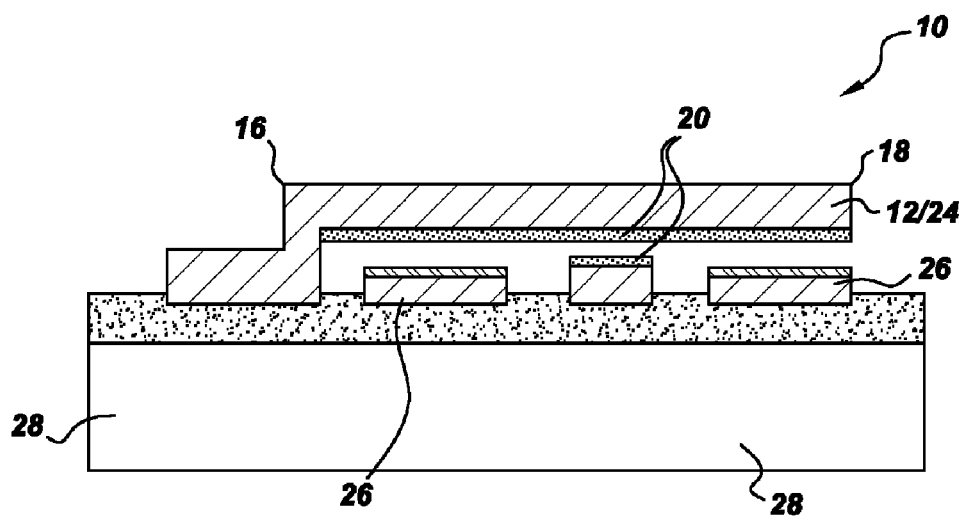
FIG. 1 is a schematic of a device according to one embodiment.

In the following description, like reference characters designate like or corresponding parts throughout the several views shown in the figures. It is also understood that terms such as "top," "bottom," "outward," "inward," and the like are words of convenience and are not to be construed as limiting terms. Furthermore, whenever a particular feature is said to comprise or consist of at least one of a number of elements of a group and combinations thereof, it is understood that the feature may comprise or consist of any of the elements of the group, either individually or in combination with any of the other elements of that group.

With continuous miniaturization of electrical devices, there is an increasing demand for contact materials with reduced contact resistance and long life. Typically used contact materials often fail to yield desirably low contact resistance and reliable contact properties. The present inventors have developed a novel contact material comprising a low melting point filler material within a porous matrix. Through proper selection of the matrix and the filler material, the contact material can be designed such that contact resistance is significantly low and the problem of metal contacts fusing or getting stuck together (stiction) is minimized.

A device for controlling the flow of current is provided in embodiments presented herein. The device includes at least a first conductor and a second conductor. The first and the second conductors are configured to alternate between an electrically connected state and an electrically disconnected state, thus regulating the flow of current though any circuit. This could be achieved by actuating either the first conductor or the second conductor or both of them to deflect from their original positions and establish electrical contact with each other. Contacts may also be made such that one element is brought between two conductors such that the movable element now bridges the two conductors and allows current or signal to flow. The device includes at least one switching structure and could further be arrayed in series and/or parallel such that an array is now considered a single device. In the embodiment below, as will be described in detail later, the first conductor is actuated such that in its "actuated state" (deviation from the original state), it is in the electrically connected state with the second conductor. However, a device where the second conductor or both of the conductors actuate is also envisioned. When the device is used in a series mode, the ON state is when the electromagnetic signal is propagating and OFF state signifies no electromagnetic signal and a physical gap between the conductors. In the embodiments described below, the actuated state is associated with the ON state, however the reverse situation is possible as well. At least one conductor, or both of the conductors, may comprise an electrical contact including a contact material in accordance with embodiments presented herein. The device may be configured to contact the first and the second conductors in order to establish the ON and the OFF states by various means, as described in detail below, depending on the device configuration and the end-use application.

An exemplary device 10 for controlling the flow of electric current with a cantilever actuator is described with reference to FIG. 1. As shown in FIG. 1, the device 10 includes a first conductor 12 designed in the form of a cantilever (movable element) with one end 16 fixed and another end 18 capable of moving and establishing a contact with the second conductor 14 in order to switch between the ON and the OFF states. As stated before, at least one conductor 12 or 14, or both of the conductors may comprise the electrical contact 20. In such embodiments, the contact material may cover the bottom portion of the first conductor 12 and/or the top portion of the second conductor at regions where they establish contact. The electrical contact 20 and methods of making the electrical contact are described in greater detail below.

The device 10 may be switched between the ON and the OFF states by any actuation process known in the art including electrostatic actuation, electromagnetic actuation, electrothermal actuation, piezoelectric actuation, pneumatic actuation, or by a combination of the above mechanisms. During electrostatic actuation, voltage is applied to parallel spaced electrodes located both on the substrate and on one of the conductors. The electrostatic force acting on the electrodes pulls down the moveable element toward the second conductor and establishes electrical contact. When the movable element is pulled away from its equilibrium position, stresses accumulate in the beam as a result. The stresses form a resultant force to counterbalance the electrostatic force. When the applied voltage is removed, the counterbalancing force returns the moveable element back to its initial position. This force, which is the sum of the stresses in the movable element, is referred to as the restoring force that "restores" the beam to its original position. During electromagnetic actuation, at least one of the conductors comprises a magnetic material and may be actuated by the magnetic field generated by the actuating voltage. In electrothermal actuation, the deformation of the material of the conductor or any other material disposed on the conductor due to heating caused by the actuating voltage is utilized in actuation. In a piezoelectrically actuated device, when the actuation voltage is applied to the cantilever, the piezoelectric material contracts in its plane, deflects the cantilever and establishes electrical connectivity with the source establishing ON state. When the actuation voltage is switched off, the cantilever goes back to the original position due to elasticity. Irrespective of the actuation mechanism and the device configuration, the electrical contact comprising the contact material of the embodiments described herein may be utilized.

The exemplary device 10 of FIG. 1, as shown in the schematic, is a three-terminal device. This device has a source electrode 22, a drain electrode 24, and a gate electrode 26 therebetween, which are all formed on a substrate 28. The first conductor 12 (movable element) is formed above the gate electrode 26 with a predetermined gap there between. In such embodiments, the source electrode 22 forms the second conductor 14 with which the first conductor 12 establishes electrical contact during the ON position. Although the electrodes are named source, drain and gate after those of metal oxide semiconductor field effect transistors (MOSFETs), the device is different in structure from MOSFETs. The first conductor 12 (movable element) has its one end 16 fixed to the source electrode 22 to form an anchor portion. The other end of the movable element 18 is made open to form a moving contact. When a voltage is applied to the gate electrode 26, the first conductor beam 12 is deflected downward by resulting electrostatic force, allowing the source electrode 22 to come into contact with the drain electrode 24 to establish the ON position. When the gate electrode 26 is de-energized, the first conductor beam 12 is restored to its original position and the device goes to the OFF position. Alternatively, the device may be a 4-terminal device, well known in the art, capable of increased isolation between the actuation and the signal paths. A four terminal device isolates the actuation voltages from the conduction lines providing added control, reliability and reproducibility for a given switch or switch type device. In certain embodiments, the moveable element 12 may be fixed at its edges and the contact may be established by bending the element towards the contact. In other embodiments the moveable element may be be fabricated such that it is machined in the bulk substrate material and the actuation direction is perpendicular to the substrates surface normal. a. The changes needed for such configurations are well known in the art.

The first and the second conductors 12, 14 may be made of any suitable material such as a semiconductor or a metal, including, for example, gold, silver, copper, nickel, tungsten, and/or the alloys thereof, and may be formed as thin films with thickness of 10 nm to 1000 nm, being deposited on the substrate 28 (such as, e.g., silicon, MgO, SiN, and/or the like). The movable element such as the first conductor 12 typically comprises a resilient material such as gold, silicon, silicon carbide or the like, in order to withstand the repetitive bending during the operation of the device. When the beams are made of a semiconductor, a conductor or an insulating layer may disposed on the beams at selective regions. For example, the source region 22 and the drain region 24 are partly or fully covered with a conductor layer comprising the contact material. The gate regions are electrically isolated from each in order to exert the actuating electrostatic force on the cantilever and to avoid shorting of the device during ON position.

Further, the conductors 12, 14 may be covered with a coating material having a relatively low coefficient of secondary electron emission in order to suppress the charge multiplication within the environment. These coatings facilitate arc reduction. Examples of such elements include, but are not limited to, titanium and titanium nitride. In such embodiments, the coatings having a relatively low coefficient of secondary electron emission may be applied on top of the contact materials. In embodiments where the cantilever (12) is configured to actuate by piezoelectric actuation, a layer of piezoelectric material is coated onto the cantilever (12). Examples of suitable piezoelectric materials include, but are not limited to, lead zirconate, lead titanate, lead magnesium niobate, and lead zirconium titanate (PZT). In such embodiments, the material coatings may be deposited by any physical or chemical deposition methods such as screen printing, dipping method, or electrophoresis.

Figure 2:
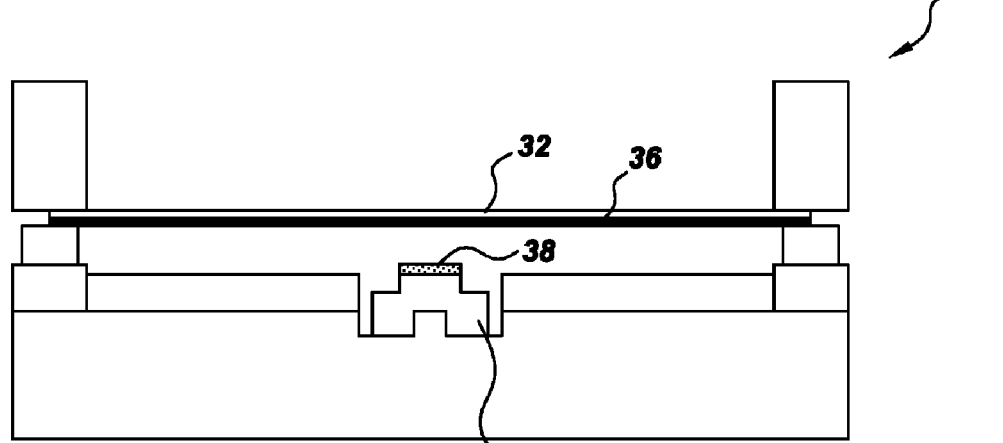
FIG. 2 is a schematic of a device according to another embodiment.
Figure 3:
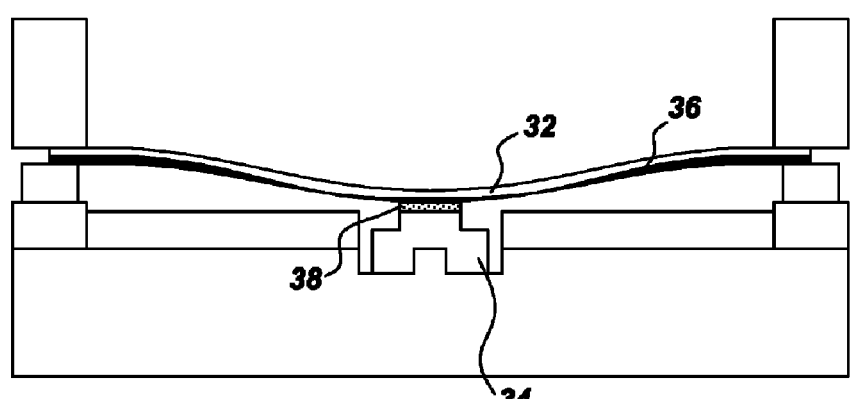
FIG. 3 is a schematic of a device according to another embodiment.

In an alternative embodiment, the device comprises a diaphragm as the moving structure. FIG. 2 shows schematics of a current controlling device 30 comprising a first conductor 32 fixed on two sides and separated from a circular diaphragm 34 (second conductor) as the actuating member, in its OFF position. No contact is established between the first conductor 32 and the top portion of the circular diaphragm 34. When the actuation voltage is applied, the current flows radially within the diaphragm, and the diaphragm moves up and establishes electrical contact with the first conductor 32 as shown in FIG. 3. The contact material of the embodiments may be disposed on the bottom portion of the first conductor 36 and the top portion of the circular diaphragm 38 where the two conductors make contact and thus ensures low contact resistance and long cycle life. Though the operation of the device is explained with a simple diaphragm-based device, various, more complicated designs are also applicable, as will be appreciated by those skilled in the art.

The actuation and the operation of the device 10 may be controlled by an external circuit of any type well known in the art, and the controlling circuit is therefore not illustrated and described herein. The device for controlling the flow of current may be a part of a processor such as a microprocessor, a graphic processor, a digital processor, or even a stand alone system with integrated logic and sensors; it may comprise a power distribution component as a part of a power distribution switching system, or a communication circuit as a part of a wire-less communication device. The device may be operated in a hermetic environment obtained through either a die-level or a wafer-level capping process. In the above embodiments, the fabrication of the device may be by any process well known in the art such as lithographic patterning processes, selective etching, electroplating, bonding and deposition techniques. As these techniques for device fabrication are well known in the art, they are not illustrated and described herein. The details of the fabrication of the contact material are described in detail in the embodiments below. The contact material may be formed during the device fabrication or may be disposed onto the selected regions of the device after the device fabrication.

Figure 4:
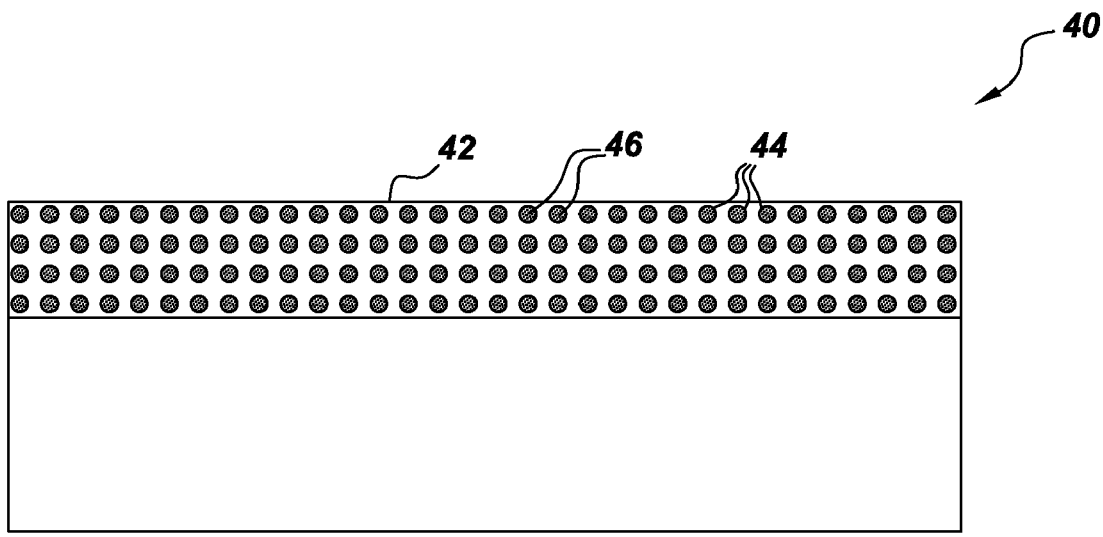
FIG. 4 is a schematic of a electrical contact according to one embodiment.

The contact material associated with the contact 20 may comprise a high electrical conductivity porous matrix filled with a low melting point material. FIG. 4 shows a schematic representation of an electrical contact comprising a contact material according to an example embodiment. The contact material 40 comprises a solid matrix 42 comprising a plurality of pores 44; and a filler material 46 disposed within at least a portion of the plurality of pores. Typically, the filler material 46 has a melting point of less than about 575 K. In one embodiment, the filler material 46 has a melting point of less than about 475 K; in another embodiment, the filler material 46 has a melting point of less than about 375 K. In still another embodiment, the filler material may be liquid at room temperature.

The matrix material can be chosen so as to obtain low resistivity, high thermal conductivity, chemical and mechanical stability of the matrix material at the device operation conditions, nominal hardness and elastic modulus, and a melting point that exceeds that of the filler material. In certain embodiments, the matrix comprises a metal. Examples of suitable metals include, but are not limited to, gold, aluminum, platinum, copper, aluminum, titanium, molybdenum, silver, tungsten, and various combinations thereof. In certain embodiments, the contact material comprises a noble metal. Noble metals are attractive due to their low resistivity, high oxidation resistance, and suitable mechanical and thermodynamic properties. In an exemplary embodiment, the metal comprises gold. In another exemplary embodiment, the metal comprises platinum.

In certain embodiments, the matrix comprises an alloy of two or more metals. Alloys may provide improved mechanical and electrical properties compared to individual metals. For example, the hardness of gold may be improved by alloying with a small amount of nickel, palladium, silver, or platinum. Examples of other additives include, but are not limited to, rhenium, ruthenium, rhodium, iridium, copper, and cobalt. Suitable alloy compositions may be chosen based on the phase diagrams to identify single-phase alloy and immiscibility regions. Additionally, hardness and resistivity values are evaluated before selecting an alloy composition for the matrix. Single-phase and miscible alloys (alloy elements completely soluble with each other) may be identified in order to avoid the problems of brittle, high-resistive, intermetallic compounds that may inadvertently be formed in two-phase and immiscible alloy regions.

Alternatively, the matrix 42 may comprise a semiconductor or an insulator. Examples of suitable semiconductors or insulators include, but are not limited to, silicon, silicon carbide, gallium arsenide, silicon, silicon nitride, silicon oxide, gallium nitride, aluminum nitride and combinations thereof. In certain embodiments, the matrix comprises a carbonaceous material such as diamond like carbon or graphite or carbon nanotubes and combinations thereof. In one embodiment, carbonaceous materials include various forms of graphite and other materials whose electrical conductivity is due at least in part to the presence of carbon, such as polymers filled or pigmented with carbon particles. In such embodiments, a high conductivity metal coating may be deposited onto the matrix layer in order to improve the contact properties. One skilled in the art would know how to choose a semiconductor material based on the desired mechanical, electrical, and thermodynamic properties.

The matrix 42 typically comprises a plurality of pores (44) to contain the filler material. Pores may be of any shape, depth, and pore spacing depending on the requirement. Typically, the plurality of pores 44 has a median pore diameter in the range from about 1 nanometer to about 10 microns. In certain embodiments, the plurality of pores 44 has a median pore diameter in the range from about 1 nanometer to about 500 nanometers. In other embodiments, the plurality of pores 44 has a median pore diameter in the range from about 1 nanometer to about 100 nanometers. Here the pore diameters defined are median pore diameter values characteristic of the population of pores. Furthermore, embodiments that embrace matrices comprising a multi-modal distribution in pore diameters are also possible, as where, for instance, the plurality of pores 44 comprises a multimodal distribution in pore diameters, or where the plurality of pores comprises more than one population of shapes.

Typically the filler material comprises a low melting point metal. The filler material 46 has a melting point of less than about 575 K. In one embodiment, the filler material 46 has a melting point of less than about 475 K; in another embodiment, the filler material 46 has a melting point of less than about 375 K. In still another embodiment, the filler material 46 may have a melting point of less than about 298 K. Some of the criteria used for selecting the filler material include stability of the filler material during operation of the device, compatibility with the matrix material, i.e., suitable wettability of the filler to the matrix material, and compatibility of the filler deposition technique with the other device fabrication techniques. Examples of suitable metals include, but are not limited to, gallium (Ga), indium (In), zinc (Zn), tin (Sn), thallium (Tl), copper (Cu), bismuth (Bi), silicon (Si), mercury (Hg), nickel (Ni), and combinations thereof. In an exemplary embodiment, the metal comprises gallium. In certain embodiments, the metal comprises a metal alloy. Suitable alloys include, but are not limited to, Ga—Bi, Ga—In, Ga—Sn, Ga—Zn, Bi—In, InBi, and In$_2$Bi. In an exemplary embodiment, the metal comprises a eutectic alloy of gallium and indium, such as an alloy comprising about 80% gallium by weight and about 20% indium by weight. In one embodiment, the alloy comprises gallium, indium, and zinc. In another embodiment, the alloy comprises gallium, indium, and tin. Some other attractive low melting point alloys are Pb—Sn—Cd—Bi, In—Pb—Sn—Bi, and In—Cd—Pb—Sn—Bi. In certain embodiments, the filler comprises a liquid metal at normal ambient temperatures. Liquid metals are incompressible and they form wetted contact and hence may reduce the contact resistance significantly by increasing the overall effective contact area.

In certain embodiments, a diffusion barrier layer may be introduced between the solid matrix and the filler material. The diffusion barrier layer may improve the stability of the matrix on exposure to high temperature or gases during the operation of the device and inhibit undesirable reaction between the matrix and the filler materials. The diffusion barrier layer is typically a few nanometers thick, but one skilled in the art will be able to determine the actual thickness based on the conditions of the specific application. The diffusion barrier layer may be deposited by any known deposition technique in the art including sputtering, evaporation, molecular vapor deposition, atomic layer deposition, spinning and the like. Examples of barrier materials include, but are not limited to, tungsten, titanium, chromium, nickel, molybdenum, niobium, platinum, manganese, and various combinations thereof. One skilled in the art would know how to choose a diffusion barrier material based on the composition of the matrix, composition of the filler, and the working environment of the device.

The total resistivity of the electrical contact depends on the sum of the resistivity of the filler material (46) and the resistivity of the matrix (42). Therefore, the resistivity of the matrix (which depends on the resistivity of the matrix material, the pore density and pore dimensions), the resistivity of the filler material, and the extent of the pore filling may all be individually controlled to achieve the desired resistivity values. Accordingly, in certain embodiments, at least one of pores is at least partially filled with a filler material. In certain other embodiments, at least some of the pores may be filled with the filler material, and in other embodiments, almost all or all of the pores are filled with the filler material. In certain embodiments, at least about 50% of the pore volume is filled with the filler material (46), in other embodiments, at least about 75% of the pore volume is filled with the filler (46). In certain embodiments, the filler material may completely fill the pores and form a thin layer over the matrix.

Another embodiment is an electrical contact material. The electrical contact material typically comprises a porous matrix having a plurality of pores; and a filler metal having low melting point disposed within at least a portion of the plurality of pores. The matrix comprises gold. The matrix may comprise other alloying additives as described in the above embodiments. The porous matrix comprising gold forms a suitable high surface area matrix for containing the filler material. The porous matrix typically comprises pores with a median pore size in the range of from about 1 nanometer to about 10 microns. In certain embodiments, the plurality of pores has a median pore diameter in the range from about 1 nanometer to about 500 nanometers. In other embodiments, the plurality of pores has a median pore diameter in the range from about 1 nanometer to about 100 nanometers.

The filler material may be any low melting point metal compatible with the matrix material including the filler materials listed in the device embodiments above. The electrical contact of the above embodiments has a comparatively low electrical resistivity relative to conventional contacts. In one embodiment, the electrical contact has a resistance of up to about 10 ohms. In one embodiment, the electrical contact has a resistance of up to about 1 ohm. In another embodiment, the electrical contact has a resistance of up to about 10 milliohms.

The contact materials of the above embodiments are suitable for low actuation devices. They are especially useful in micro-devices, where the actuation force is in the micro-newton to milli-newton range. In such low actuation force devices, there is not enough force to deform the typically used contact materials to achieve the required high contact area and hence low contact resistance. In such devices, the contact materials of the embodiments provide low contact resistance and long life. Typically, the device when applied to these low actuation devices as a single device element, has a largest dimension of less than about 1 centimeter. In one embodiment, the device when used as a single device element has a largest dimension of less than about 1 millimeter. In another embodiment, the device when used as a single device element has a largest dimension of less than about 500 microns. In another embodiment, the device when used as a single device element has a largest dimension of less than about 100 microns. The above embodiments refer to a single device element such as a single micro electromechanical systems (MEMS) switch containing the contact material, but one could envision having these devices arrayed out in series and parallel to form a more complex electronic circuitry or MEMS based devices.

The contact material of the above embodiments may provide many advantages including an increase in the actual contact area, reduced contact resistance, less heat generated at the contacts, reduction in the amount of force needed for low contact resistance, increase in the mechanical lifetime of the device, decrease the actuator size and power consumption. These contacts may also act to quench the heat caused by arcing and prolong the lifetime of the contact surfaces. These devices are suitable for, but not limited to, miniature electrical switches, contactors, relays, circuit breakers in power distribution systems because of their low power requirements, possibility of distributed controls, and improved switching capabilities compared to the known switching devices.

In certain embodiments, the device comprises a switch. In one embodiment, the switch comprises a micro electromechanical systems (MEMS) switch. The MEMS switch may be a dc electric switch, a radiofrequency (RF) switch, a microwave, or a millimeter wave switch. The device may be a switch where the actuation and the switching signals share the same control line, or a relay where there is a full galvanic insulation between the actuation and the switching signals. The MEMS device may be an electrostatic actuated device that uses an electric field to actuate the device operation, a magnetic actuated device that uses a magnetic plate to actuate the device, or a thermal switch that uses a bimetallic plate or a thermal composite that bends/deforms according to the temperature to make or break the circuit. The details of the design and operation of such switches are well known in the art.

Figure 5:
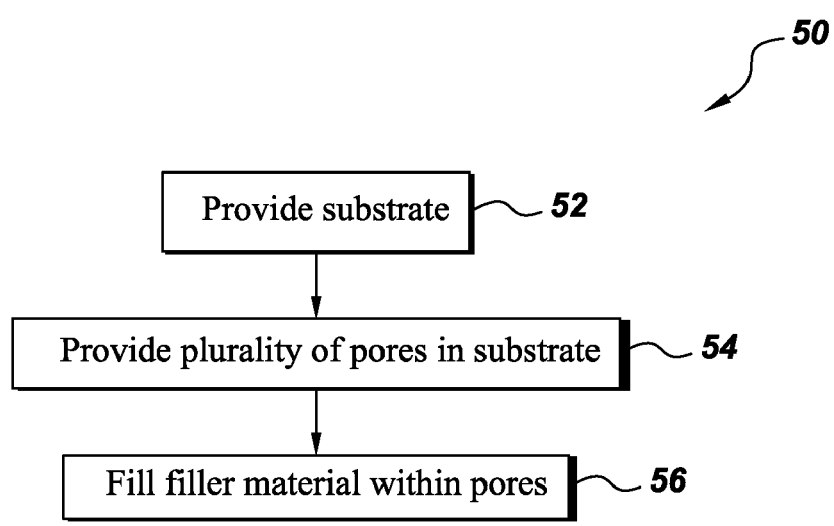
FIG. 5 is a flow chart of a method of making an contact material according to one embodiment

A flow chart of a method 50 for making an electrical contact is shown in FIG. 5. The method comprises: providing a substrate in step 52; providing a plurality of pores on the substrate in step 54; and disposing a filler material within at least a portion of the plurality of pores in step 56. The filler material has a melting point of less than about 575 K. The filler and the matrix materials could be any suitable material including the materials described in the contact material embodiments.

Typically, a porous substrate is used as the matrix for containing the filler material. Any method known in the art may be used for making a porous substrate. Examples of suitable pore forming techniques include, but are not limited to, ion beam etching, lithography, self assembly, micro machining, anodic etching, replication, investment casting, stamping, soft lithography, electro spinning, laser drilling, and the like. The substrate may be deposited as a porous layer or alternately, a non-porous substrate may be converted into a porous matrix by any pore forming technique known in the art. Techniques such as ion beam etching, anodic etching and the like are known to create dense uniform pores of any desired pore sizes. Variations in the process parameters to obtain desired pore structures, including either open or closed pore structures, are apparent to those skilled in the art.

In an exemplary embodiment, the substrate comprises a matrix material and a secondary material dispersed within the matrix material. At least a portion of the secondary material dispersed with the matrix material is selectively dissolved to obtain a porous matrix material. Any process known in the art may be used for selectively removing the portion of the dispersed secondary material including chemical etching, electrochemical etching, heating, plasma etching, reactive ion etching, and deep reactive ion etching and the like. For example, a composite of a metal and polymer particles such as latex particles may be deposited as a layer and then latex particles may be removed by heating or chemical etching to obtain a porous metal matrix. In an exemplary embodiment, the matrix comprises an alloy of gold and silver. Gold and silver are completely miscible with each other and hence it is possible obtain a highly uniform pore structure on selectively removing one of the components. For example, a portion of silver dissolved in gold may be removed by chemical etching using an acid such as nitric acid.

The filler material is disposed within the pores of the porous structure. Examples of suitable filling processes include, but are not limited to, thermal evaporation, electron beam evaporation, sputter deposition, spin casting, injection, spray coating, pressure infiltration, electrodeposition, and capillary filling of the filler material. The exact process used depends on the melting point of the filler material, cost, and various other criteria.

The embodiments presented herein are fundamentally different from the devices and the contact materials conventionally used. For instance, liquid metal contact microswitches and reed relays have been described previously. In most of these devices, the liquid metal is controlled/moved to make and break a contact. In the present device, the contact material comprises a low melting point alloy included in a porous matrix. The contact material shows substantially low contact resistance and can be applied to any kind of electrical device. Incorporating the low melting point materials within the porous matrix essentially increases the actual contact area and hence yields low contact resistance.

EXAMPLE

Method of Preparing the Contact Material

In this example, a cleaned Si wafer was used as a substrate. To promote the gold adhesion to silicon, a chromium film of about 15 nanometers was deposited on this Si wafer by DC sputtering. Subsequently, a gold film of about 200 nanometers was deposited onto the chromium film by DC sputtering. Following the above step, a gold-silver (Au—Ag) film (with composition of 1:1) of about 200 nanometers was deposited onto the gold film by DC sputtering. The Au—Ag film was subjected to a thermal annealing at 200° C. for an hour. The composition of the Au—Ag (1:1) film was further confirmed by elemental analysis. The dealloying of Ag was carried out by exposing the Au—Ag film to 70% $HNO_3$ (volume percent) for one hour. After dealloying, the wafer was washed in deionized water followed by drying in nitrogen gas. Electron microscopy on the dealloyed films confirmed uniform pore formation. Further, the porous Au film was observed to exhibit an open pore structure. Thereafter, the pores of the porous Au film were filled with gallium by thermal evaporation.

Figure 6:
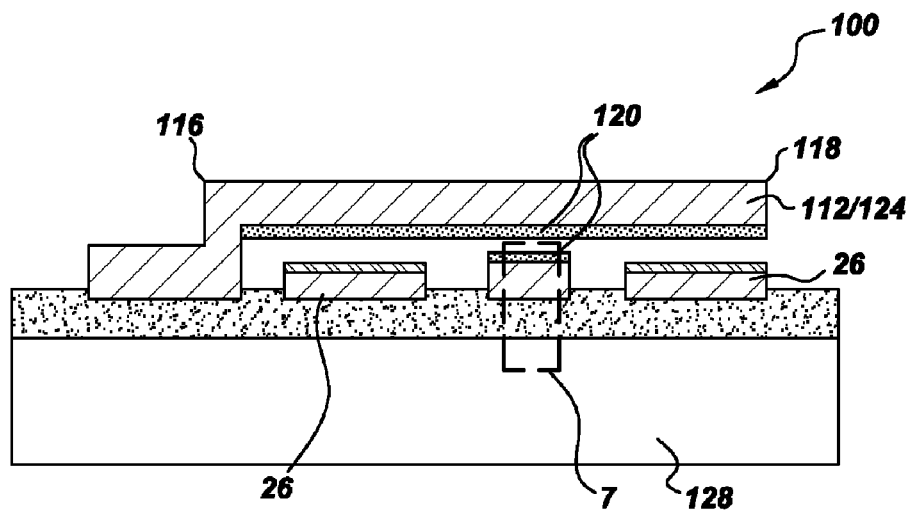
FIG. 6 is a schematic of a device according to another embodiment.
Figure 7:
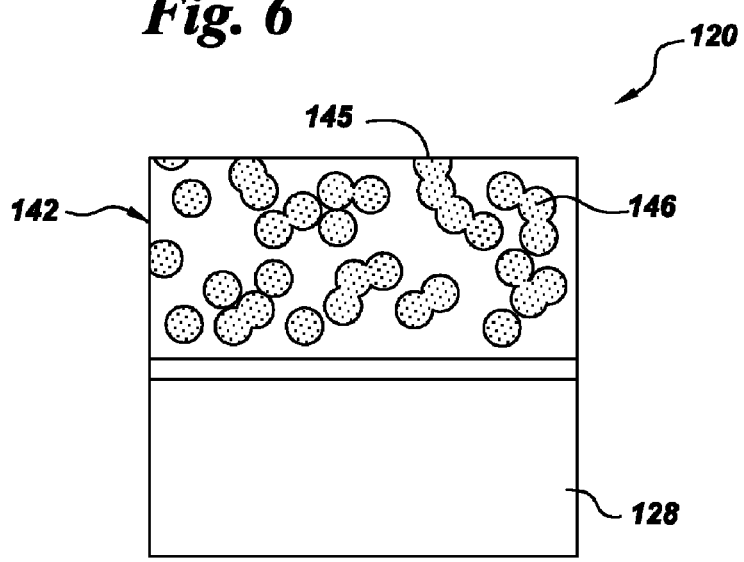
FIG. 7 is a magnified view of the area labeled 7 in FIG. 6.
Figure 8:
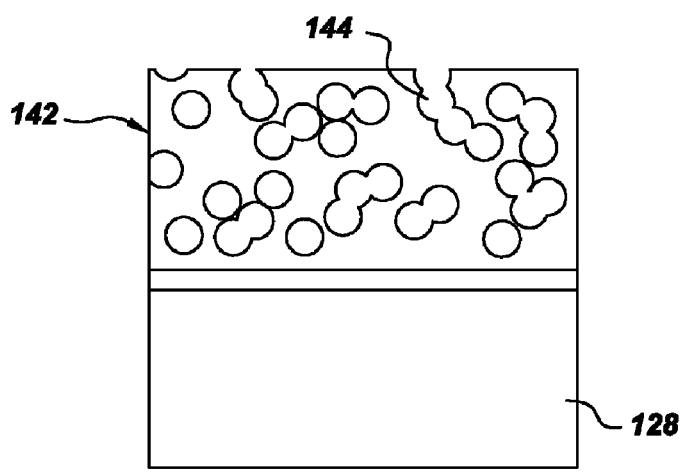
FIG. 8 is a side view of the contact of FIG. 7 with the filler material removed.

Referring to FIGS. 6-8, another example device 100 for controlling the flow of electric current includes a first conductor 112 and a second conductor 114. The first conductor 112 can be designed in the form of a cantilever (movable element) with one end 116 fixed and another end 118 capable of moving and establishing a contact with the second conductor 114 in order to switch between the ON and the OFF states. At least one conductor 112 or 114, or both of the conductors, may comprise an electrical contact 120. The device 100 may be a three-terminal device, having a source electrode 122, a drain electrode 124, and a gate electrode 126, which are all formed on a substrate 128.

The contact 120 may include a porous matrix 142 filled with a conductive filler material 146. The matrix 142 can be a solid material that defines a plurality of pores 144. The pores 144 may be configured so as to exhibit an open pore structure whereby the pores are interconnected to form one or more substantially continuous conduits through the matrix 142. In some embodiments, the matrix 142 may include a high electrical conductivity material. The filler material 146 may be a low melting point material that is liquid at operating temperatures of the device 100 (such as at or around room temperature, ~298 K). The filler material 146 can substantially fill the pores 146 or may be disposed within only a portion of the plurality of pores. The filler material 146 may have a relatively high electrical conductivity (e.g., the filler material may be a liquid metal).

Embodiments including a contact 120 having a porous matrix material 142 with pores 144 that define an open pore structure filled, at least partially, with an electrically conductive liquid filler material 146 may provide several advantages. For example, due to the high surface area, the matrix material 142 with the open pore structure may have ability to distribute the liquid filler material 146 uniformly, by capillary forces, throughout the contact 120, while at the same time serving to contain the liquid filler material within the contact. Further, for embodiments where the pores 144 intersect a contact surface 145 of the contact 120, liquid filler material 146 may come in contact with another conductor (e.g., conductor 112) configured to make contact therewith. As a result, liquid filler material 146 may be drawn up into further contact with the opposing conductor 112 so as to increase the effective contact area between the contact and the conductor. Further, liquid filler material 116 may be drawn away from areas where contact is not made (e.g., due to surface irregularities) between the contact 120 and the conductor 112. This latter feature may prove especially useful where the contact 120 is part of a MEMS switch, where contact forces are often insufficient to induce significant deformation in the contacting surfaces, as the open pore structure along with the liquid filler material may have ability to deform and thereby provide a relatively large contact surface area (and hence a relatedly low contact resistance).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. In particular, the cantilever arm, the anchor structure, the electrical contact, gate, source, and drain regions may be formed in various forms including multiple anchor points, cantilever arms, and electrical contacts. Therefore, it is intended that the invention not be limited to the particular embodiment disclosed as the best mode contemplated for carrying out this invention, but that the invention will include all embodiments falling within the scope of the appended claims.

The invention claimed is:

1. A device comprising:
a first conductor; and
a second conductor switchably coupled to the first conductor to alternate between an electrically connected state with the first conductor and an electrically disconnected state with the first conductor;
wherein at least one conductor further comprises an electrical contact, the electrical contact comprising
a solid matrix comprising a plurality of pores configured so as to exhibit an open pore structure; and
a filler material disposed within at least a portion of the plurality of pores, the filler material having a melting point of less than an operating temperature of the device,
wherein the first and second conductors are configured to contact in the electrically connected state with a contact force less than or equal to about 10 millinewtons.

2. The device of claim 1, wherein the matrix comprises at least one material selected from the group consisting of gold, aluminum, platinum, copper, titanium, molybdenum, silver, and tungsten.

3. The device of claim 1, wherein the plurality of pores has a median pore diameter in the range from about 1 nanometer to about 500 nanometers.

4. The device of claim 1, wherein the filler material comprises a metal.

5. The device of claim 4, wherein the metal of the filler material comprises at least one selected from the group consisting of gallium, indium, zinc, tin, thallium, copper, bismuth, silicon, mercury and nickel.

6. The device of claim 1, wherein the filler material has a melting point of less than or equal to 298 K.

7. The device of claim 1, wherein the electrical contact further comprises a diffusion barrier layer between the solid matrix and the filler material.

8. The device of claim 7, wherein the barrier layer comprises a material selected from the group consisting of tungsten, titanium, chromium, nickel, molybdenum, niobium, platinum, and manganese.

9. The device of claim 1, wherein at least one said first and second conductors has a thickness in a range from about 10 nm to about 1000 nm.

10. An electrical contact comprising:
a solid matrix comprising a plurality of pores configured so as to exhibit an open pore structure, wherein the solid matrix comprises gold; and
a filler material disposed within at least a portion of the plurality of pores, the filler material comprising a metal having a melting point of less than or equal to 298 K.

11. The electrical contact of claim 10, wherein the metal of the filler material comprises at least one selected from the group consisting of gallium, indium, zinc, tin, thallium, copper, bismuth, silicon, mercury, and nickel.

12. The device of claim 10, wherein the plurality of pores has a median pore diameter in the range from about 1 nanometer to about 500 nanometers.

* * * * *